UNITED STATES PATENT OFFICE.

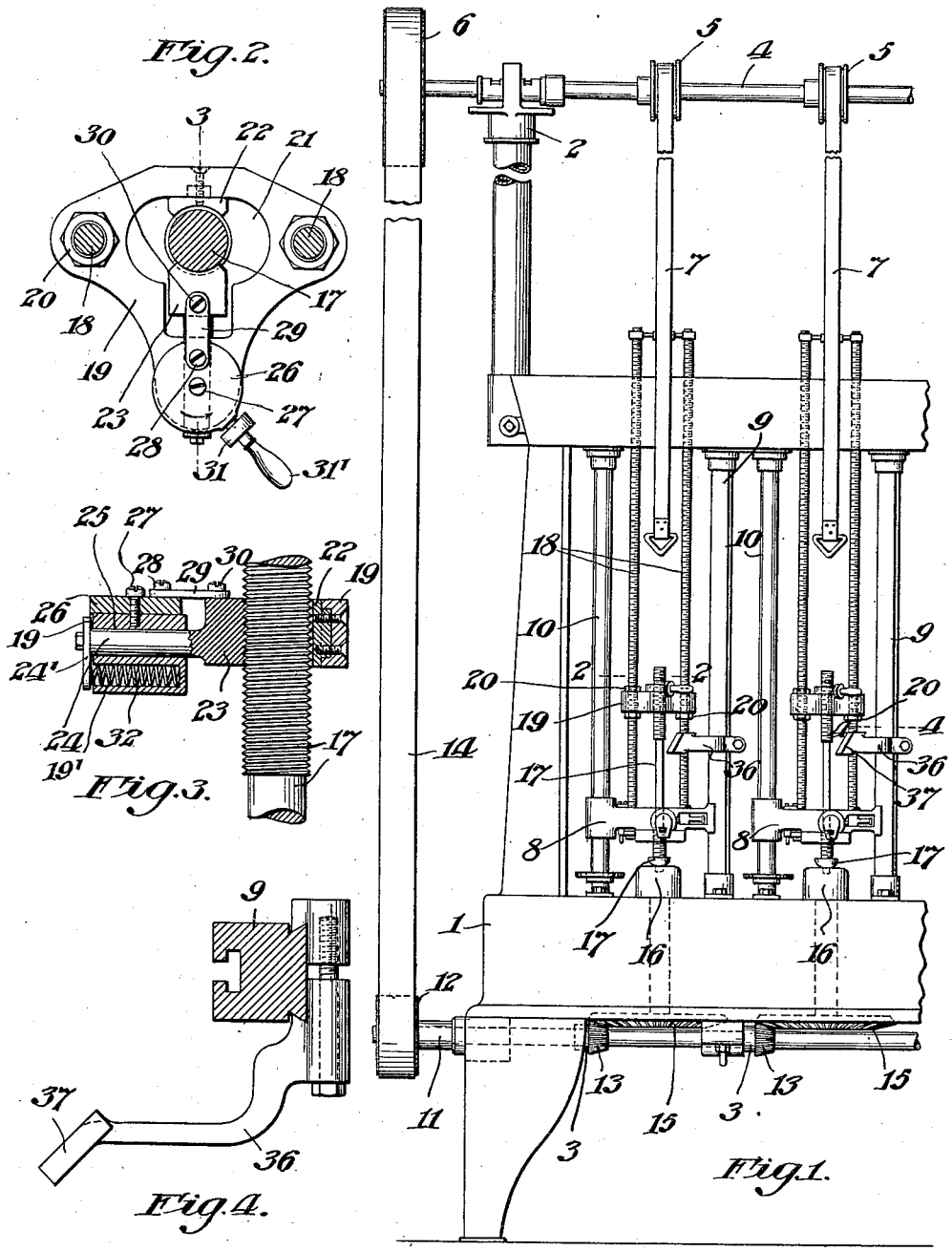

ARTHUR M. HARRINGTON AND ROBERT F. SCOTT, OF PHILADELPHIA, PENNSYLVANIA, ASSIGNORS TO EDWIN HARRINGTON, SON & CO., INC., OF PHILADELPHIA, PENNSYLVANIA, A CORPORATION OF PENNSYLVANIA.

BOLT-THREADING MACHINE.

1,085,577.      Specification of Letters Patent.      Patented Jan. 27, 1914.

Application filed July 3, 1913. Serial No. 777,357.

*To all whom it may concern:*

Be it known that we, ARTHUR M. HARRINGTON and ROBERT F. SCOTT, citizens of the United States, and residents of the city of Philadelphia, county of Philadelphia, and State of Pennsylvania, have invented certain Improvements in Bolt-Threading Machines, of which the following is a specification.

Our invention relates more particularly to the operations involved in cutting threads on stay bolts, and its primary object is to provide simple mechanism for regulating the operation of cutting, especially starting, the thread at one end of a bolt to the pitch of a thread previously cut on the other end, the cutting tool being guided in the operation of forming the second thread under control of means engaging the first thread.

In the accompanying drawings, Figure 1 is an elevation of part of a stay bolt machine embodying our improvements; Fig. 2 is an enlarged sectional view of the same taken on the line 2—2 of Fig. 1; Fig. 3 is a sectional view taken on the line 3—3 of Fig. 2; and Fig. 4 is an enlarged sectional view taken on the line 4—4 of Fig. 1.

The machine, as illustrated in the drawings, comprises the frame 1 provided with bearings 2 and 3. A driving shaft 4 is journaled in the bearings 2, pulleys 5 and 6 are fixed on this shaft, and straps 7 are adapted to be wound on the pulleys 5 to elevate the cutter or chaser heads 8, which are movable vertically along the guide bars 9 and 10. A shaft 11 is journaled in the bearings 3, a pulley 12 and beveled pinions 13 are fixed on this shaft and a belt 14 connects the pulleys 6 and 12. The pinions 13 revolve beveled gears 15 which revolve stocks 16 fixed thereto. The stocks 16 engage the heads of and turn the bolts 17 as the heads 8 descend along the guide bars 9 and 10 and cut the threads, first on the point and then on the head end of the bolts.

Threaded rods or screws 18 are fixed to each head 8 and have a follower or block 19 engaged in adjustable relation thereto by internally threaded sleeves 20 swiveled in the block, the latter containing an aperture 21 through which the point or top of the bolt 17 is adapted to pass. A bearing 22 is fixed to the block 19 within the aperture 21 and a sectional nut 23 is connected with the block, so as to be movable into and out of engagement with the threaded point of the bolt 17, by a stem 24 movable longitudinally in the hole 25. A disk 26 is journaled on the block 19 by the stud 27 and is connected eccentrically, by a stud 28 with a link 29, the link being connected by a stud 30 with the nut 23. The disk is provided with a roller 31 and a handle 31' for turning it.

A coiled compression spring 32 is seated in the socket 19' of the block 19 and bears against the arm 24' fixed to the stem 24, the spring acting to retract the sectional nut 23. When the disk 26 is turned by the handle 31' in the direction of the arrow to the limit of its movement and occupies its position shown in Fig. 2, the sectional nut 23 engages the threaded part of the bolt 17, where it is held against the action of the spring, due to the alinement of the studs 27, 28 and 30 or to carrying the center of the stud 28 slightly beyond the line joining the centers of the studs 27 and 30.

An arm 36 provided with a cam 37 is clamped on the guide bar 9, the arm being adjustable vertically on the bar. The cam 37 is placed in the path of the downwardly moving roller 31 when the disk 26 is in the position required for holding the nut 23 in its inner position in engagement with the thread on the point of the bolt 17.

In operation, the chaser heads 8 move from their elevated position downwardly along the bars 9 and 10 as the stay bolts 17 are revolved by the stocks 16. The descending heads first cut the threads on the points of the bolts and thereafter cut the threads on the lower or head ends in exact pitch with the threads on the upper ends by reason of the engagement with the latter threads of the sectional nuts 23. When the descending blocks 19 and the connected parts of the follower mechanism have finished their work, the rollers 30 engage the cams 37 which turn the disks 26 reversely to the direction of the arrow and the springs 32 act through the parts 24' and 24 to retract the nuts 23 which are held in the withdrawn position. The respective follower mechanisms can now be elevated (clear of the bolts) with the chaser heads.

Having described our invention, we claim:

1. In a bolt threading machine, the combination with a movable tool adapted for cutting a thread, of controlling means adapted for engaging a thread cut by said tool to regulate the further cutting operation thereof, mechanism for connecting said tool and controlling means, and means for automatically disengaging said controlling means.

2. In a bolt threading machine, the combination with a movable tool adapted for cutting a thread, of controlling means adapted for engaging a thread cut by said tool to regulate the further cutting operation thereof, mechanism for connecting said tool and controlling means, and means comprising a cam for automatically disengaging said controlling means.

3. In a bolt threading machine, the combination with a movable tool adapted for threading a bolt, of controlling means adapted for engaging a thread on said bolt, and means comprising a rod for connecting said tool and controlling means.

4. In a bolt threading machine, the combination with a movable thread cutting mechanism, guiding means whereby said mechanism is adapted to be reciprocated and means for turning a bolt to be threaded by said mechanism, of a follower having a sectional nut adapted for engaging a thread of said bolt, and means comprising tie rods for connecting said follower with said mechanism whereby said mechanism is caused to cut a thread in pitch with the thread engaged by said follower.

5. In a machine for threading bolts, the combination with a chaser head, guides along which said head is movable by gravity and means for revolving the bolt to be threaded by said head, of a follower, means whereby said follower is connected with said head so as to move therewith, and means carried by said follower for engaging a thread whereby said head is caused to cut a thread of like pitch.

6. In a bolt threading machine, the combination with a chaser head, guiding means along which said head is adapted to reciprocate, and means for turning a bolt to be threaded by said head, of a device containing an aperture, a sectional nut connected in movable relation to said device, and means for reciprocating said sectional nut into and out of engagement with the thread of a bolt in said aperture.

7. In a bolt threading machine, the combination with a chaser head, vertical guides along which said head is movable and means for turning a stay bolt, of an apertured block, means comprising threaded rods and swiveled sleeves for connecting said block in adjustable relation to said rods, a bearing in said block for engaging a stay bolt passing through the aperture therein, a sectional nut, means whereby said nut is connected with said block, and means comprising a spring for holding said nut out of its operating position.

8. In a bolt threading machine, guiding means, thread cutting means adapted to reciprocate along said guiding means, a block containing an aperture connected with said cutting means, a sectional nut connected with said block so as to be movable in said aperture, means comprising a lever fulcrumed on said block whereby said nut is reciprocated, a spring connected with said lever so as to move said nut, and a cam for engaging said lever and shifting said nut.

In testimony whereof we have hereunto set our names this 26th day of June, 1913, in the presence of the subscribing witnesses.

ARTHUR M. HARRINGTON.
ROBT. F. SCOTT.

Witnesses:
   Jos. G. DENNY, Jr.,
   GEO. A. CUNNEY.

---

Copies of this patent may be obtained for five cents each, by addressing the "Commissioner of Patents, Washington, D. C."